United States Patent [19]
Cohn

[11] 3,767,474
[45] Oct. 23, 1973

[54] SEALING METHODS AND COMPOSITIONS FOR ALUMINUM OXIDE COATINGS

[75] Inventor: Charles C. Cohn, Atlantic City, N.J.

[73] Assignees: Samuel L. Cohn; Charles C. Cohn, Philadelphia, Pa.

[22] Filed: Sept. 22, 1971

[21] Appl. No.: 182,909

[52] U.S. Cl.................. 148/6.1, 148/6.27, 204/35 N
[51] Int. Cl. ................................................. C23f 7/06
[58] Field of Search.................... 148/6.1; 204/35 N, 204/6.27

[56] References Cited
UNITED STATES PATENTS

| | | | |
|---|---|---|---|
| 3,171,797 | 3/1965 | Klingenmaier.................... | 204/35 N |
| 2,008,733 | 7/1935 | Tosterud........................... | 204/35 N |
| 3,689,379 | 9/1972 | Treiber............................. | 148/6.1 X |

*Primary Examiner*—Ralph S. Kendall
*Attorney*—Smith, Harding, Earley & Follmer

[57] ABSTRACT

Methods and compositions are provided for dyeing and sealing, or sealing without dyeing, aluminum oxide coatings. Used for this purpose are aqueous compositions containing disodium 4-dodecylated oxydibenzene sulfonate and one or more hydrolyzable metallic salts, typically of the metals Ni, Co, Pb, Sn, Al, Cr, Cu, Mn, Fe and Bi. If dyeing is to be effected, the dye is included in the sealing composition.

8 Claims, No Drawings

SEALING METHODS AND COMPOSITIONS FOR ALUMINUM OXIDE COATINGS

BRIEF SUMMARY OF THE INVENTION

Much used are porous coatings on aluminum (which term is here used to include its alloys) which coatings largely comprise hydrated aluminum oxide and are produced either electrolytically (i. e., by anodizing) or chemically. These coatings have various purposes: protection against abrasion, dye absorption, etc. For many uses, however, these porous oxide coatings require sealing to close their pores. For example, if they are colored by adsorption of dyes, sealing is quite generally required to prevent the dye from being removed by contact of the product with liquids or by atmospheric action; conversely, if the coating is uncolored, or colored by dyes or pigments, it must be protected against being stained by other substances such as foods or drinks, or the like. But an important aspect of sealing even in addition to the foregoing is to avoid corrosion by exposure to the weather, particularly to atmospheric conditions when salt, acids or heavy metals are present, as in the case when aluminum is used architecturally, in vehicles, on shipboard, or the like.

A great number of sealing procedures are known and need not be described except for certain more advantageous ones improved in accordance with the present invention.

One of the sealing procedures heretofore available is that of Klingenmaier U.S. Pat. No. 3,171,797, dated Mar. 2, 1965 to which reference may be made for details. In brief, porous aluminum oxide coatings are treated with a solution of disodium 4-dodecylated oxydibenzene sulfonate. As a result of sealing with this compound a fair degree of resistance to pit corrosion (but not to staining or acid solution) is achieved. Because of numerous references to the above-mentioned compound hereinafter, it will be conveniently referred to as DDOS.

It has been common to effect sealing of porous aluminum oxide coatings by producing in the pores what are apparently the products of hydrolyses of metal salts, in particular salts of metals which are weakly basic. The practice in this respect is exemplified by the disclosure of Tosterud U.S. Pat. No. 2,008,733, dated July 23, 1935. Metals mentioned in this patent and others, in the form of salts typified by acetates and sulfates are precipitated in the form of insoluble compounds such as hydroxides or basic salts in the pores when the salts are incorporated in near boiling solutions of proper compositions. Reference may be made to the last mentioned patent for typical details of procedure. Metals whose salts may thus be used include, as practical ones for commerical use, the following: Ni, Co, Pb, Sn, Al, Cr, Cu, Mn, Fe and Bi.

Though the two sealing methods which have just been briefly described produce fairly good sealing effects and are commerically used, I have found that sealing with a solution containing both DDOS and hydrolyzable metallic salts produces extraordinary effects particularly with respect to promoting resistance to corrosion, there apparently being a synergistic action of the two mixed compounds.

There is still another result secured in accordance with the invention when applied to the dyeing of porous aluminum oxide coatings. Heretofore, it has generally been necessary to effect final dyed results in two distinct active steps (disregarding such steps as cleaning and rinsing). First, after preliminary preparation of the oxide coated surface, dyeing has been effected in a suitable dye bath, and then sealing has been separately accomplished. In accordance with the present invention, it is possible to dye and seal simultaneously, incorporating the dye in the sealing solution containing DDOS and one or more hydrolyzable metal salts of the type above indicated. To secure desired shades, dyes may be mixed in the solution. The result is the production of properly dyed coatings thoroughly sealed to prevent removal of the dye and also sealed to prevent corrosion and staining of the final product to the same extent as when the sealing procedure is used without dyeing.

Resistance to corrosion is such an important aspect of the invention that it is desirable to mention a particular corrosion test which has been found in practice to correlate exceedingly well with corrosion which is produced by atmospheric action, particularly when that action is largely due to salt, acids or heavy metals in the air or by exposure of saline water. Discussions of comparative results appearing hereafter are with respect to the application of the test procedure under its standard conditions.

The test procedure is known in the art as the proposed acid dissolution test for anodically coated aluminum — for A.S.T.M. Committee BO8.06. (For brevity this test will be hereafter referred to as "the corrosion test".) The procedure is carried out in well standardized fashion, but for purposes of the present disclosure may be briefly described as follows:

The test solution consists of 20 grams of chromic acid anhydride ($CrO_3$) and 35 milliliters of 85% orthophosphoric acid in distilled or deionized water, to make up a total volume of 1 liter.

Clean specimens to be tested having approximately 12 square inches (0.774 square decimeters) of total anodized surface (sealed or unsealed) are weighed to the nearest milligram and immersed in the test solution for 15 minutes with stirring at a temperature of 37.8°C. (100°F.). The specimen is then removed, washed in deionized or distilled water, and dried in clean air. The specimen is then again weighed and the loss of weight determined in milligrams per square decimeter of the anodized surface.

The test solution has the property of dissolving aluminum oxide coatings but of being inert with respect to metallic aluminum, at least under the test conditions.

Long experience has shown that the test just described correlates extremely well with the resistance of aluminum oxide coatings to deterioration in corrosive atmospheres, the less the metal oxide removed in the test, the more resistant the oxide coating being in terms of the time which would be involved before deleterious corrosion would occur in correspondingly coated structures.

It has been heretofore considered, generally, that losses less than 20 milligrams per square decimeter represent a satisfactory coating; that losses between 20 and 40 milligrams per square decimeter represent adequate coatings for many purposes; but that losses greater than 40 milligrams per square decimeter represent unsatisfactory coatings. These figures, however, depend largely upon requirements of users. In what follows, this test is applied to sealed porous oxide coatings.

To avoid unnecessary repetitions in this description it is to be understood that percentages are by weight (unless otherwise noted) and that pH values are determined, in standard fashion, at a temperature of 25°C. even though solutions referred to are used at other (usually higher) temperatures. Also, where pH values are referred to the measurements are made after boiling of the solutions to produce stabilization.

DETAILED DESCRIPTION

The various aspects of the invention will now be described with first reference to the more detailed procedure involving dyeing since, when coloring is not required, the same procedures may be utilized with omission of dye to secure equally good corrosion resistance. Thereafter there will be further described other procedures in accordance with the invention which may be utilized where corrosion resistance is the sole or major desired end, with some of the procedures not being applicable to use when dyeing is to be effected.

Not all dyes which have been conventionally used for coloring aluminum oxide coatings may be used in accordance with my invention, and, accordingly, it will be preliminarily desirable to set forth the major classes of dyes which have been found suitable for use in single step dyeing and sealing in accordance with the invention. These dyes fall in certain classes of the conventional Colour Index, and these classes are defined by ranges of Colour Index Numbers (C. I.) as follows:

Acid Dyes

Monoazo and Disazo types: C. I. 13,000 to 26,000.
Aminoketone types: C. I. 56,000 to 56,999.
Xanthene types: C. I. 45,000 to 45,999.

Direct Dyes

Monoazo, Disazo, Trisazo and Polyazo types: C. I. 13,000 to 35,000.
Quinoline types: C. I. 47,000 to 47,999.
Stilbene types: C. I. 40,000 to 40,999.

Acid Metalized Dyes

Monoazo types: C. I. 11,000 to 18,800.

Neutral Metalized Dyes (No Colour Index Numbers appear to be assigned to these dyes.)

For the practice of the invention, the aluminum or aluminum alloy is desirably anodized under conditions such as are conventional for producing adsorbent oxide coatings which are to be colored, and these conditions may vary quite considerably in accordance with practices well-known in the art. For example, the anodizing may be carried out in an electrolyte comprising 15% of $H_2SO_4$ in water at 70°F. at 12 to 16 amperes per square foot for 15 to 60 minutes, followed by rinsing. The coating thickness should range from about 0.1 mil to 1.0 mil or more.

Before proceeding with descriptions of examples of simultaneous dyeing and sealing, reference may be made to what will be referred to as a "nitric acid test" particularly applicable to determine the adequacy of sealing of dyed coatings with respect to both removal of the dye and with respect to resistance to later staining by other colored materials.

Used for this test is a nitric acid solution comprising 50 percent by volume of 42° Be nitric acid in water. The test is carried out by placing on the dyed and sealed specimen a drop of this nitric acid solution for 2 minutes at room temperature followed by rinsing and air-drying. If the nitric acid has visibly removed any color the test is considered as having failed. If the nitric acid has not removed any color, a drop of a solution of one gram of Acid Violet 34 in 50 milliliters of deionized water is placed on the nitric acid-treated spot and left thereon for 5 minutes, and the specimen is then water rinsed and air-dried. If the applied drop of this dye solution has stained the spot the test is considered to have failed. Failure in the first part of the test would indicate that the seal was inadequate to prevent removal of the dye used for coloring; failure in the second part of the test would indicate that the specimen would be likely to be stained by other materials.

In the following examples the aluminum was conventionally anodized in $H_2SO_4$ to produce a porous oxide coating. One example of the practice of the invention involved the use of an aqueous dye bath containing 3 g/l of the dye C. I. 20470, 1 g/l sodium diacetate, 0.2 g/l of crystalline nickel nitrate, and 0.2 g/l of DDOS used at a temperature of 210°F. with an immersion time of 15 minutes, the bath having a pH of 5.3.

To illustrate a typical temperature and time variation, the same bath composition was used for 5 minutes at the relatively low temperature of 120°F., resulting in a blue-black coloration as compared with the deep black obtained at the higher temperature and with a longer anodizing time (which produces a thicker coating).

A further example involved the same bath but with the dye C. I. 22375 substituted for the dye C. I. 20470 with an immersion for 15 minutes at 160°F. at a pH of 5.0, with a resulting orange color.

In another example, there was substituted in the otherwise same composition the dye C. I. 31850 with treatment for 15 minutes at 210°F. at a pH of 4.7, a purple coloration being obtained.

In a further example the dye bath consisted of a mixture of dyes, there being 6 g/l of C. I. 13250 and 2 g/l of C. I. 20470 with 1 g/l of sodium diacetate, 0.1 g/l of nickel nitrate and 0.1 g/l of DDOS with immersion for 15 minutes at 210°F. at a pH of 7.5, with a resulting orange-green color.

Another example involved the use of a mixture of 4 g/l of C. I. 13250 and 4 g/l of C. I. 20470 in place of the last mentioned mixture of dyes, with the other constituents of the bath the same and the conditions of operation being the same, with the exception that the pH was 5.1. A deep green color was obtained.

In another example all of the last mentioned conditions were the same except that there was substituted for the dye mixture of 5 g/l of C. I. 30045 and 2 g/l of C. I. 20470, a deep green being obtained.

In still another example the last mentioned dye mixture was replaced by 5 g/l of C. I. 20470 and 3 g/l of C. I. 17045 (but with a pH of 6.2) with a resulting black color.

A repetition of the last, but with 4 g/l instead of 3 g/l of C. I. 17045, and having a pH of 7.0 gave a dark brown color.

A bronze color was obtained using a mixture of 2 g/l of C. I. 20470 and 6 g/l of C. I. 15510 with the same nickel nitrate and DDOS proportions but at a pH of 5.8 with 2 g/l of sodium diacetate.

A light blue color was obtained using as the bath a mixture of 3 g/l of C. I. 20470, 1 g/l of sodium diacetate, 0.1 g/l of nickel nitrate and a much larger proportion, 10 g/l of DDOS, with the bath operating at 180°F. for 15 minutes with a pH of 5.6.

Illustrative of another variation in comparison with the last example, dyeing was effected in a bath comprising 3 g/l of C. I. 20470, 1 g/l of sodium diacetate. 10 g/l of nickel nitrate and 0.2 g/l of DDOS with immersion for 15 minutes at a temperature of 180°F. and a pH of 4.9, to obtain a blue-black color.

With a bath comprising 3 g/l of C. I. 20470, 1 g/l of sodium diacetate, and 10 g/l of each of nickel nitrate and DDOS, with immersion for 15 minutes at 180°F., at a pH of 5.3, a medium blue coloration was obtained.

A light gold coloration was obtained using a bath comprising 3 g/l of C. I. 30345, 1 g/l of sodium acetate and 0.2 g/l of each of nickel nitrate and DDOS with 15 minute immersion at 210°F. at a pH of 5.7.

A yellow coloration was obtained using a bath comprising 3 g/l of Cibalan Brown 2 GL (a neutral metalized dye), 1 g/l sodium acetate, 0.2 g/l of nickel nitrate and 0.2 g/l of DDOS with immersion for 15 minutes at 210°F., the bath having a pH of 7.4.

A red color was obtained using a bath comprising 3 g/l of C. I. 28160, 1 g/l of sodium diacetate, and 0.2 g/l of each nickel nitrate and DDOS with immersion for 15 minutes at 210°F., at a pH of 4.7.

Repeating the last example but with a substitution for the dye of 3 g/l of C. I. 34140 and at a pH of 5.3, a violet coloration was obtained.

The foregoing examples have been selected to indicate the varying results obtained utilizing various dyes, various concentrations of hydrolyzable salt (crystalline nickel nitrate) and of DDOS at varying temperatures and pH values. In many of the cases similar conditions were maintained to give comparisons.

In summary, the following may be said:

Concentrations of dyes (single or in combinations) give variations in depths of colors, and in some cases even quite substantially different colors, for example, where a dye when used with considerable dilution may give one color, in high concentration the color may appear black. Since particular colors are generally desirable, necessary tests must be made on small samples to arrive at desired colors, and if a test indicates that a color is not sufficiently deep, the amount of dye may be increased or treatment in the bath may be prolonged or carried out at a higher temperature or a thicker anodically formed coat. Different shades may best be obtained by observation followed, possibly, by the addition of another dye. In general, it has been found that dyes of the types mentioned above are quite generally usable, but this, obviously, does not preclude the possibility of using other dyes, and whether or not particular dyes are applicable can only be determined by tests. Some dyes give rise to unstable, short-lived baths, whereas from the standpoint of commerically reducing costs dyes should be used which are stable and continue to give uniform results throughout extended use of a bath.

As the examples indicate, the DDOS concentration in the bath may vary greatly, there being used such concentrations as will (along with concentrations of hydrolyzable salts) give good sealing using, as criteria, both the corrosion test and the nitric acid test. All of the examples given above pass both tests.

Generally it is desirable that the DDOS be used in a concentration upwards of 0.01 g/l, with little advantage gained if its concentration is greater than around 0.2 g/l. For commerical purposes, 0.1 g/l would generally be used. Higher concentrations, such as 10 g/l given in some of the examples are generally unncessary and wasteful.

For proper sealing results, hydrolyzable salts are required to be present. Nickel nitrate has been referred to as used in the foregoing examples merely to afford comparisons; with crystallized nickel nitrate the concentrations are generally desirably upwards of about 0.1 g/l, while more than 0.2 g/l is unnecessary though no detriment is produced even at high concentrations of 10 or more g/l. Other nickel salts (acetate, sulfate, etc.) may be used in corresponding amounts. But the hydrolyzable metal salt may be of numerous other metals, though generally these are not as commerically desirable either because of cost or because they give rise to less stable baths, nickel salts being sufficiently inexpensive, very stable, and thoroughly acceptable. Other metals whose salts may be used are given above.

For purposes of information, pH values of baths have been noted in the examples, but these are not critical and may vary greatly and particular care should be taken to adjust pH values for dye baths which operate best, considering the particular dyestuff at its own optimum pH value. In general, it may be said that there should be avoided such low pH values as might produce attack on aluminum; while the pH values should not be so high as to produce alkalinity which would tend to attack the aluminum oxide coating. Generally speaking, pH values between 4.5 and 7.5 are satisfactory though some variations below and above these values are not unusable.

Buffers are desirably present, not particularly to set the pH at definite values, but rather to maintain the action of a bath more uniform through extended use because of depletion of the constituents including loss of water by evaporation which changes concentrations of the materials in the bath, what is commerically desirable being essentially that color should be uniform throughout a long useful life of the bath. Sodium diacetate or sodium acetate are commerically acceptable buffers for this purpose, though many others may be used such as boric acid, sodium formate, etc. To secure the uniform operations desired, buffers are desirably used in substantial quantities though 1 to 2 g/l will generally suffice.

As has been pointed out, the single step dyeing and sealing procedure carried out in the same bath is highly advantageous in the saving of multiple manipulation and the sealing effected by the use of the combination of DDOS and hydrolyzable salt is generally sufficient for practical purposes. However, in cases where extremely high corrosion resistance is desirable, the dyeing and sealing step may well be followed by additional sealing which may be in accordance with conventional practices though desirably well might be carried out in accordance with what follows herein.

When the combined dyeing and sealing baths are used as described above, the presence of the dye contributes to sealing, and therefore dyes may sometimes be used where they might seem to be unnecessary from the standpoint of producing colors. For xample, so-called "integral coloring" is frequently commerically used particularly for architectural or other outdoor uses. Integral colored surfaces are produced by anodizing aluminum alloys by procedures well-known in the art in which in the anodizing alloying metals are transformed into oxides which become included in the aluminum oxide coating to produce various colors such as blacks, grays, bronze, gold or other colors. These are desirably sealed in baths which contain dyes of corresponding colors, the dyes contributing to sealing with relatively minor changes of the original colors produced by anodizing, though the dyes may deepen these colors.

Another aspect of the invention involves the sealing to obtain extreme corrosion resistance even when coloring is not required and there will now be described this aspect of the invention. This, of course, is also applicable to sealing of aluminum oxide coatings if they have desirably been colored by dyes which are or are not applicable to the single step dyeing and sealing procedure, since the sealing will not detrimentally affect such dyeing. Pigmented oxide coatings may also be sealed in accordance with the following procedure.

A series of comparable examples may now be given. In these examples the aluminum alloy 5457–H25 was anodized in 15% sulfuric acid at 70°F., using a current density of 12 amperes per square foot, but for various times as indicated below.

In one example the alloy was anodized for 10 minutes, and after rinsing was sealed in a bath comprising 12 g/l of sodium formate, 0.1 g/l of DDOS and 0.2 g/l of nickel sulfate at 210°F. for 10 minutes. The loss of weight in the corrosion test was 1 milligram per square decimeter.

In a second case, the anodizing was carried out for 30 minutes and the sealing was effected in the same bath at 210°F. for 15 minutes. The weight loss in the corrosion test was less than 1 milligram per square decimeter.

In a third example the anodizing was carried out for 60 minutes and sealing was effected the same as in the last example. In this case the weight loss was 1 milligram per squre decimeter.

In a fourth example anodizing was carried out for 60 minutes and sealing was effected in a bath in which no buffer was used but containing 0.8 g/l of DDOS and 0.1 g/l of nickel sulfate, the sealing being effected for 15 minutes at 210°F. The weight loss was less than 1 milligram per square decimeter.

In a fifth example anodizing was carried out for 30 minutes and sealing was in a bath containing no buffer but containing 10 g/l of DDOS and 0.1 g/l of nickel sulfate, the sealing being for 15 minutes at 210°F. The weight loss was 1 milligram per square decimeter.

In a sixth example anodizing was carried out for 30 minutes and sealing was effected in a bath without buffer but containing 0.1 g/l of DDOS and 10 g/l of nickel sulfate for a period of 15 minutes at 210°F. The weight loss was less than 1 milligram per square decimeter.

All of these examples represent a negligible weight loss in the corrosion test and indicate the quite wide range of sealing bath compositions with substantial independence of the degree of anodizing to form the porous aluminum oxide coating. Other tests, which need not be detailed, have indicated that the sealing should be effected near the boiling point of the sealing bath, with the concentration of nickel sulfate, or other nickel salts, upwards of about 0.1 g/l and with DDOS present in the amount of 0.01 g/l or upwards. Generally upwards of 0.1 g/l DDOS should be used in practice. Excessive amounts of DDOS and nickel salts are not required. The pH values of the sealing baths may range from around 5.6 to 8.5 but are not critical. As previously indicated, buffers are desirable primarily to maintain the sealing baths in operation for long periods, not being required, however, for establishing pH values, and at least limited operations are possible even without any buffering material.

Very similar results are obtained for a wide variety of aluminum alloys, and it may be generally stated that the invention is applicable to all alloys which form porous coatings by anodizing in conventional commercial fashions. Desirably anodizing conditions are used which, as well known in the art, are most suitable for the production of satisfactory anodic coatings on particular alloys. Numerous tests have indicated that hydrolyzable salts of the other metals listed herein may be used in place of nickel salts with quite comparable results though the superiority of nickel salts is generally indicated. If other hydrolyzable metallic salts are used in concentrations approximately those given for nickel salts (0.1 g/l and upwards) it has been found that in the corrosion tests the losses are generally of the order of less than 6 milligrams per square decimeter, far less than those resulting from the use of seals heretofore known, which losses have generally been little less than 20 milligrams per squre decimeter. Cobalt salts give results as good as nickel salts, but are more expensive. Typical salts giving good results are maganese sulfate, lead nitrate, copper sulfate, tin acetate and zinc nitrate.

When the sealing solutions contain lower concentrations of DDOS the surfaces are wettable; but when high concentrations of DDOS are used they shed water.

While the foregoing description of uses of the invention has related primarily, by way of examples, to treatments of porous aluminum oxide coatings on aluminum produced by anodizing, and particularly by anodizing in sulfuric acid baths, the invention is also applicable to the treatment resulting in sealing alone, or simultaneous dyeing and sealing, of porous aluminum oxide coatings produced by other anodizing procedures or produced by chemical treatments conventional in the art. For example, various applicable anodizing procedures may be carried out in accordance with the following patents:

U.S. Pat. Nos. 1,735,286, 1,735,509, 1,771,910, 1,869,041, 1,869,042, 1,869,058, 1,900,472, 1,977,622, 2,231,373, 2,233,785, 2,356,543, 3,280,013, 3,341,435, 3,411,994, 3,423,298, 3,425,918 and 3,565,772.

British patents 409,679 and 537,474.

French patent 1,549,454.

Chemical methods for producing porous aluminum oxide coatings which may be used for treatments in accordance with the invention may be carried out in accordance with the following patents:

U.S. Pat. Nos. 2,507,956, 2,909,455, 2,936,254, 3,300,842, 3,380,858, 3,404,043 and 3,447,972.

British patent 436,704.

While the nitric acid test has been mentioned particularly with respect to dyed coatings, it may also be used to test for the satisfactory nature of seals produced without dyeing since it serves as a measure of resistance of sealed coatings to staining even though the final coatings are uncolored.

It will be understood that in the following claims the term "aluminum" refers both to practically pure aluminum as well as to aluminum alloys which are known to be capable of being satisfactorily coated, anodically or otherwise, without porous aluminum oxide coatings even when the oxide coatings may contain substantial amounts of other metals.

I claim:

1. The method of coating an aluminum surface comprising producing a porous aluminum oxide coating thereon and then sealing said coating with a hot aqueous solution containing DDOS in a concentration of about 0.01 gram per liter and a soluble hydrolyzable metallic salt in a concentration of at least about 0.1 gram per liter.

2. The method of claim 1 in which the hydrolyzable salt is a salt of nickel.

3. The method of coating an aluminum surface comprising producing a porous aluminum oxide coating thereon and then sealing said coating with a hot aqueous solution containing DDOS in a concentration of at least about 0.01 grams per liter, a soluble hydrolyzable metallic salt in a concentration of at least about 0.1 gram per liter, and a dye compatible with the other constituents of said solution.

4. The method of claim 3 in which the hydrolyzable salt is a salt of nickel.

5. The method of claim 3 in which the aluminum is an alloy containing at least one metal which is oxidized in forming the coating to produce a colored coating, and in which the dye used has a color corresponding to that of the coating.

6. A bath for sealing a porous aluminum oxide coating on aluminum comprising an aqueous solution containing DDOS in a concentration of at least about 0.01 gram per liter and a hydrolyzable metallic salt in a concentration of at least about 0.1 gram per liter.

7. A bath according to claim 6 in which the hydrolyzable salt is a nickel salt.

8. A bath according to claim 6 in which there is also a dye compatible with the other constituents of the bath.

* * * * *